United States Patent
Mazuir et al.

(10) Patent No.: US 11,104,267 B1
(45) Date of Patent: *Aug. 31, 2021

(54) EXTERIOR LIGHTING AND WARNING SYSTEM

(71) Applicant: Apple Inc., Cupertino, CA (US)

(72) Inventors: Clarisse Mazuir, San Jose, CA (US); Arthur Y. Zhang, San Jose, CA (US); Albert J. Golko, Saratoga, CA (US); Bivin J. Varghese, San Jose, CA (US); Christopher P. Child, Cupertino, CA (US); Collin J. Palmer, San Mateo, CA (US); Daniel E. Potter, San Jose, CA (US); Thaddeus Stefanov-Wagner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 16/169,943

(22) Filed: Oct. 24, 2018

Related U.S. Application Data

(63) Continuation of application No. 15/221,376, filed on Jul. 27, 2016, now Pat. No. 10,112,528.

(Continued)

(51) Int. Cl.
*B60Q 1/44* (2006.01)
*B60Q 1/30* (2006.01)
(Continued)

(52) U.S. Cl.
CPC .............. *B60Q 1/444* (2013.01); *B60Q 1/28* (2013.01); *B60Q 1/30* (2013.01); *B60Q 5/006* (2013.01); *B60T 7/12* (2013.01); *G05D 1/021* (2013.01)

(58) Field of Classification Search
CPC . B60Q 1/444; B60Q 1/28; B60Q 1/30; B60Q 5/006; B60T 7/12; G05D 1/021
See application file for complete search history.

(56) References Cited

U.S. PATENT DOCUMENTS 4,270,115 A * 5/1981 Bonnett ............... B60Q 11/007
340/431
4,663,609 A * 5/1987 Rosario ................. B60Q 1/444
340/467

(Continued)

OTHER PUBLICATIONS

U.S. Appl. No. 62/097,365, filed Dec. 29, 2014 (Year: 2014).*

(Continued)

*Primary Examiner* — Calvin Cheung
(74) *Attorney, Agent, or Firm* — Treyz Law Group, P.C.; Kendall W. Abbasi

(57) ABSTRACT

A vehicle may have vehicle controls that are used in steering, braking, and accelerating the vehicle. The vehicle may have sensors that gather information on vehicle speed, orientation, and position. The sensors may also gather information on relative speed between the vehicle and a following vehicle, information on risks of a collision between a vehicle and an external object, and other vehicle status information and vehicle operating environment information. Control circuitry may use light-based devices to display braking information, information on vehicle speed, the relative speed between a vehicle and a following vehicle, autonomous driving mode status information, custom brake light information or other user-selected information, or other information on vehicle status and the operating environment of a vehicle.

20 Claims, 10 Drawing Sheets

Related U.S. Application Data

(60) Provisional application No. 62/198,045, filed on Jul. 28, 2015.

(51) Int. Cl.
*B60T 7/12* (2006.01)
*G05D 1/02* (2020.01)
*B60Q 1/28* (2006.01)
*B60Q 5/00* (2006.01)

(56) References Cited

U.S. PATENT DOCUMENTS

| | | | |
|---|---|---|---|
| 4,833,444 A * | 5/1989 | Wisniewski | B62J 6/04 340/432 |
| 4,928,084 A * | 5/1990 | Reiser | B60Q 1/444 340/469 |
| 5,680,118 A | 10/1997 | Cusumano et al. | |
| 5,815,072 A | 9/1998 | Yamanaka et al. | |
| 6,025,775 A | 2/2000 | Erlandson | |
| 6,140,918 A | 10/2000 | Green et al. | |
| 6,553,130 B1 | 4/2003 | Lemelson et al. | |
| 6,700,502 B1 * | 3/2004 | Pederson | B60Q 1/2611 340/463 |
| 6,812,851 B1 | 11/2004 | Dukach et al. | |
| 7,449,998 B1 | 11/2008 | Au et al. | |
| 7,478,492 B2 | 1/2009 | Madonia | |
| 7,493,202 B2 | 2/2009 | Demro et al. | |
| 8,096,069 B2 * | 1/2012 | Ishikawa | G03B 21/14 40/591 |
| 9,007,193 B2 | 4/2015 | Boston et al. | |
| 9,738,225 B1 | 8/2017 | Au et al. | |
| 9,852,670 B2 | 12/2017 | Swanson | |
| 2003/0030555 A1 * | 2/2003 | Cole | B60Q 1/444 340/479 |
| 2003/0197606 A1 | 10/2003 | Epstein | |
| 2005/0062597 A1 | 3/2005 | Su | |
| 2005/0174227 A1 * | 8/2005 | Bolander | B60Q 1/22 340/464 |
| 2005/0187698 A1 | 8/2005 | Arai | |
| 2006/0098448 A1 * | 5/2006 | Coast | B60Q 1/44 362/517 |
| 2006/0254142 A1 | 11/2006 | Das et al. | |
| 2011/0050102 A1 | 3/2011 | Le Bars et al. | |
| 2011/0106334 A1 | 5/2011 | Filev et al. | |
| 2011/0224844 A1 | 9/2011 | Farwell et al. | |
| 2013/0342427 A1 * | 12/2013 | Cai | G06K 9/00671 345/4 |
| 2014/0136414 A1 * | 5/2014 | Abhyanker | G06Q 10/087 705/44 |
| 2015/0031148 A1 | 1/2015 | De et al. | |
| 2017/0021837 A1 * | 1/2017 | Ebina | B60W 50/082 |
| 2017/0247041 A1 * | 8/2017 | Kim | B60W 50/14 |
| 2017/0371334 A1 * | 12/2017 | Nagy | B60W 50/14 |

OTHER PUBLICATIONS

"California Vehicle Code Section 24603", all pages, retrieved on Feb. 9, 2021 from https://leginfo.legislature.ca.gov/faces/codes_displaySection.xhtml?lawCode=VEH&sectionNum=24603 (Year: 2021).*

* cited by examiner

EXTERIOR LIGHTING AND WARNING SYSTEM

This application is a continuation of patent application Ser. No. 15/221,376, filed Jul. 27, 2016, which claims the benefit of and claims priority to provisional patent application No. 62/198,045, filed Jul. 28, 2015, both of which are hereby incorporated by reference herein in their entireties.

BACKGROUND

This relates generally to systems that generate warnings, and, more particularly, warnings such as brake light warnings for vehicles.

Vehicles such as automobiles have brake lights. When a driver brakes to slow a vehicle, the brake lights are activated. The brake lights are mounted on the rear of the vehicle, so the driver a following vehicle can be informed about the braking status of the vehicle. Some vehicles have brake lights that flash under hard braking to warn following vehicles.

Although existing systems for informing following vehicles of braking status can be satisfactory in normal driving conditions, it would be desirable to provide additional brake status information and additional warnings in many situations. It would therefore be desirable to be able to provide improved brake lighting and warning systems.

SUMMARY

A vehicle may have vehicle controls that are used in steering, braking, and accelerating the vehicle. The vehicle may have sensors that gather information on speed, orientation, position, and other vehicle operating status information. The sensors may also gather information on relative speed between the vehicle and a following vehicle, information on when there is a risk of a collision between the vehicle and an external object, road conditions, and other environmental conditions.

A vehicle may have audio output devices to create audio output, light-based devices such as devices based on one or more light-emitting diodes to supply light output, and wireless circuitry to wirelessly transmit warnings and other messages. Light-based devices may use edge-lit or backlit light guides, organic light-emitting diode display panels, liquid crystal display panels, light modulators based on liquid crystals, and other circuitry for generating light output. The light output may include large areas of a single color, may include text, icons, or other visual content, may include moving content, may include light of multiple colors, and may include other patterns of light.

Light-based devices in a vehicle may be used to display braking information, information on vehicle speed, the relative speed between a vehicle and a following vehicle, autonomous driving mode status information, custom brake light information or other user-selected information, or other information on vehicle status and the operating environment of a vehicle. This information may also be provided using audio output devices, wireless circuitry that transmits warning messages, and other output devices in a vehicle.

Light-based devices may also display greetings and other information to a driver of a vehicle as the driver is approaching the vehicle from the outside and as the driver walks around the vehicle. Sensors may track the location of a user who is near to the vehicle and can adjust the light-based devices so that a greeting or other information is presented on a portion of the vehicle that can be viewed by the user. Good-by messages may be presented to a driver after the driver has parked the vehicle and is leaving the vicinity of the vehicle.

DETAILED DESCRIPTION

Systems such as vehicles and other systems may have exterior lighting. Lighting systems on the exterior of a vehicle may be used to provide information to occupants of other vehicles, pedestrians, cyclists, other road users, and others outside of a vehicle. The information that is provided may reflect vehicle status. Examples of vehicle status information that may be conveyed to include vehicle speed, vehicle braking status, whether a vehicle is being driven autonomously or manually, whether a vehicle is about to exit a highway at a particular exit or is about to make a turn onto a nearby road, the following distance and closing speed of a following vehicle, and information regarding potential hazards (e.g., whether a pedestrian is too close to a moving vehicle, etc.). The information that is provided using the exterior lighting systems may also include information on the operating environment of a vehicle such as road hazards, weather, traffic conditions, and collision risks. If desired, vehicle status information, operating environment information, and other information may be conveyed wirelessly to nearby vehicle occupants and pedestrians. This information may also be provided to others using audio output or types of output.

Figure 1:
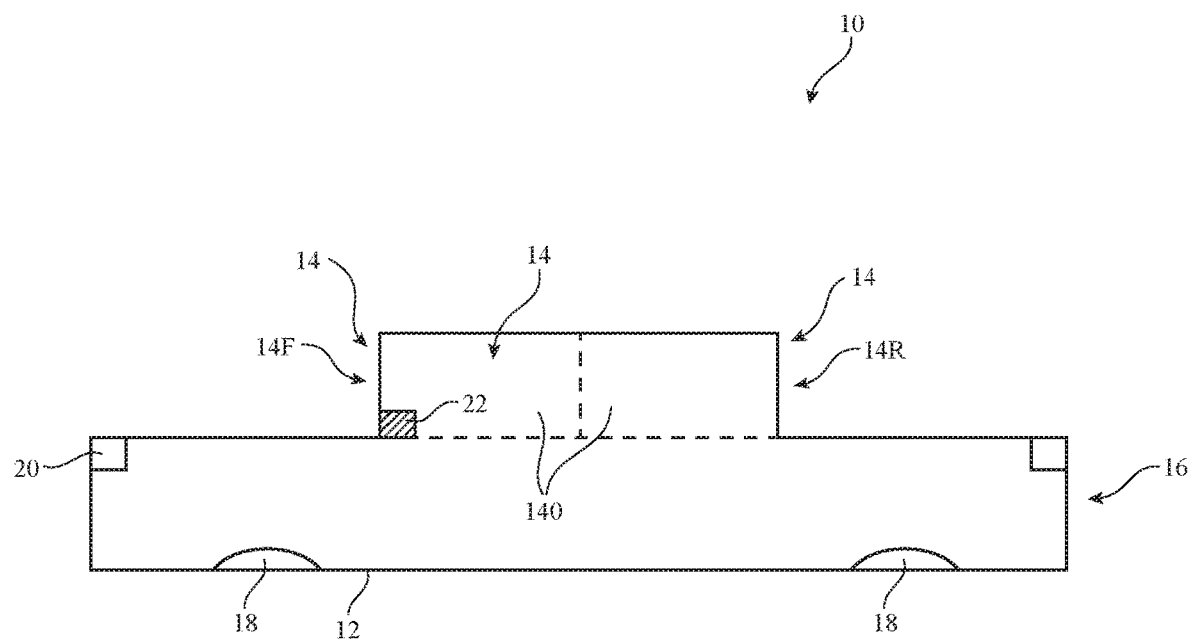
FIG. 1 is a side view of a portion of an illustrative vehicle in accordance with an embodiment.

An illustrative vehicle of the type that may be provided with input-output devices for gathering information on vehicle status and the operating environment of a vehicle and for providing corresponding output to the occupants of nearby vehicles and others is shown in FIG. 1. As shown in FIG. 1, vehicle 10 may include a body such as body 12. Body 12 may have body panels and other structures that are supported by chassis structures (e.g., body-on-frame chassis structures, unibody chassis structures, or other suitable chassis structures). Portions of body 12 may include doors. Interior components in vehicle 10 such as seating for a driver and other vehicle occupants may be mounted within body 12 and external components such as wheels 18 may be mounted to body 12 (e.g., seats and wheels 18 may be coupled to chassis structures in body 12). The structures that make up body 12 may include metal structures, structures formed from fiber-composite materials such as carbon-fiber materials and fiberglass, plastic, and other materials.

Windows 14 may be formed at the front and rear of vehicle 10 in openings in body 12 and may be formed within the doors or other portions of the body 12 of vehicle 10. As shown in FIG. 1, for example, vehicle 10 may have a front window such as front window 14F that faces the front of vehicle, rearward facing windows such as rear window 14R, and side windows such as windows mounted within the doors of vehicle 10 (see, e.g., side windows 14D). Windows 14 may be formed from glass (e.g., glass laminated with polymer layers), plastics such as polycarbonate, or other clear materials.

Vehicle 10 may include mirrors such as side mirrors 22. Side mirrors 22 may be formed on the left and right sides of vehicle 10 and may include light-based output devices such as light-emitting diodes. Vehicle 10 may also be provided with lights on the rear of vehicle 10 such as rear lights 16 (e.g., turn signal lights, brake lights, tail lights, etc.). Rear lighting may also be provided on rear window 14R and/or other portions of the rear of vehicle 10. The rearward facing lighting of vehicle 10 may include center high mounted stop lamps (CHMSL) such as light 24. Light 24 may emit light through rear window 14R or may be mounted on other rear portions of vehicle 10. Additional lights in vehicle 10 such as lights 20 may include headlights, turn signal lines, and fog lights. In general, lighting may be provided on any interior and/or exterior surface of vehicle 10 such as the roof of vehicle 10, the rear window or other rear surfaces of vehicle 10, the front window or other front surface of vehicle 10, the doors or other side surface of vehicle 10, protruding portions of vehicle 10 such as mirrors 22 or bumpers, or any other vehicle surface. The lighting for vehicle 10 (e.g., external lighting) may be provided using light-based devices (light sources) that have been mounted on the surface of vehicle 10 (e.g., on body 12, inside a portion of body 12, in body 12 in an arrangement where the exterior of the light-based devices is flush with the surface of body 12, etc.) and/or using lighting in the interior of vehicle 10 such as lighting that that emits light through windows 14.

Figure 2:
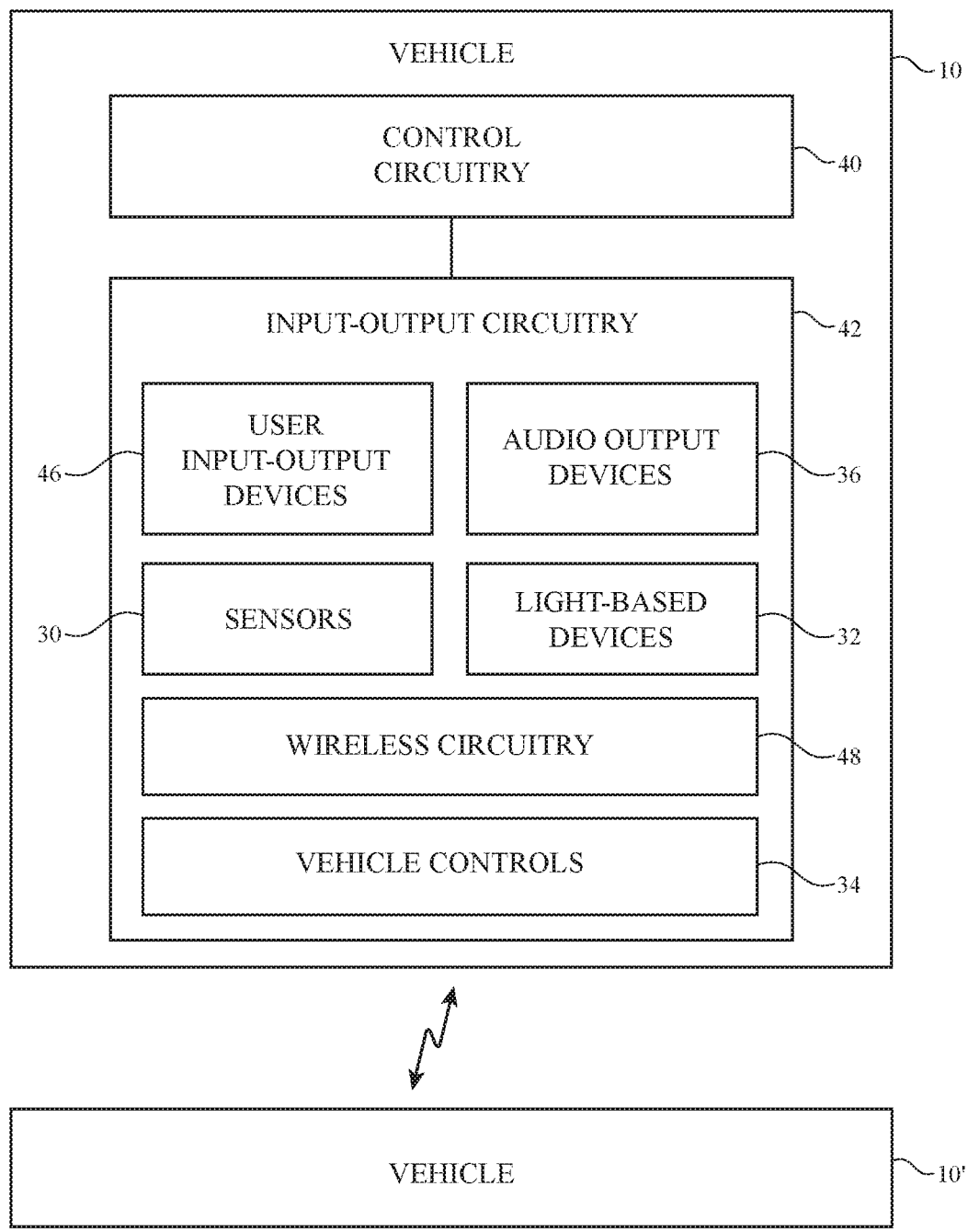
FIG. 2 is a schematic diagram of an illustrative vehicle or other system in accordance with an embodiment.

A schematic diagram of illustrative circuitry that may be included in vehicle 10 is shown in FIG. 2. As shown in FIG. 2, vehicle 10 may include control circuitry 40. Control circuitry 40 may include storage and processing circuitry for supporting the operation of vehicle 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 40 may be used to control lighting, audio devices such as speakers, wireless transmitters to transmit information to equipment external to vehicle 10, and other devices operating in vehicle 10. If desired, the processing circuitry in control circuitry 40 may drive vehicle 10 autonomously. The processing circuitry may be based on one or more microprocessors, microcontrollers, digital signal processors, baseband processors, power management units, audio chips, application specific integrated circuits, electronic control units, etc.

Vehicle 10 may include input-output components such as input-output circuitry 42. Input-output circuitry 42 allows vehicle 10 to gather data and allows vehicle 10 to supply output data for a driver of vehicle 10, people outside of vehicle 10, and/or external or internal systems. Input-output circuitry 42 may, for example, be use to provide audio and visual information to the driver and other occupants of vehicle 10, to the drivers and other occupants of other vehicles such as external vehicle 10' (e.g., a vehicle following vehicle 10 in the roadway or driving elsewhere in relation to vehicle 10), and to other road users and pedestrians outside of vehicle 10. In some situations, the information supplied to the occupants of vehicle 10 and/or to people outside of vehicle 10 may serve as a warning. For example, brake light output may warn a driver of a following vehicle that vehicle 10 is slowing, a speed gauge or text (e.g., alphanumeric characters such as digits representing speed in mph or km/hr) may inform the driver of a following vehicle of the current speed of vehicle 10 or the relative speed between a vehicle and the following vehicle, and text or other output may inform people near to an autonomously driven vehicle that the vehicle is operating autonomously (e.g., output may inform people that vehicle 10 is autonomously turning, accelerating, stopping, etc.). In other situations, audio and visual information (e.g., visual information on the exterior of vehicle 10, etc.) may be provided that serves as a greeting, a good-by message, an advertisement or other commercial message, reminders (e.g., "check tire pressure"), or a public service announcement. User-customized text messages, icons, audio clips, and other customized media output may be supplied using the audio and visual output capabilities of vehicle 10.

Input-output circuitry 42 may include sensors 30 for gathering information on the operating environment of vehicle 10. Sensors 30 may include light-based sensors, wireless sensors such as radar sensors, light detection and ranging (lidar) sensors, ultrasonic sensors, proximity sensors, range-finding sensors based on light, acoustics, radio-frequency signals, or other signals, ambient light sensors that measure that amount of light on the exterior of vehicle 10 and/or the interior of vehicle 10, cameras (e.g., stereoscopic cameras or other camera systems that operate at visible wavelengths and/or infrared wavelengths and that include digital image sensors), strain gauges, parking sensors, cruise control sensors, accelerometers, touch sensors, magnetic sensors such as electronic compass sensors for determining vehicle orientation, temperature sensors, rain sensors and other moisture sensors, force sensors, pressure sensors (e.g., altimeters), parking brake sensors, trunk position sensors, tire pressure sensors, door position sensors, seatbelt sensors, speedometers, odometers, satellite navigation system sensors (e.g., Global Positioning System circuitry for determining vehicle location, speed, and heading), and other components for making measurements on the operating environment for vehicle 10. If desired, sensors 30 may be used to detect the positions, headings, and speeds of objects that are external to vehicle 10 relative to vehicle 10. For example, sensors 30 may detect how rapidly a following vehicle is closing in on the rear of vehicle 10 or may detect how rapidly a pedestrian is approaching vehicle 10 due to movement of vehicle 10 and/or movement of the pedestrian. Sensors 30 may also detect a risk of potential collisions with external objects such as when vehicle 10 is about to strike a road obstruction that has moved in front of vehicle 10 while vehicle 10 is moving at high speed. Sensors 30 may track the movement of the driver of vehicle 10 before the driver has entered vehicle 10 and/or after the driver has exited vehicle 10. For example, sensors 30 may track movement of the driver as the driver walks around vehicle 10.

As shown in FIG. 2, input-output circuitry 42 may include user input-output devices 46. Devices 46 may be used to gather input from users (e.g., a driver or passenger of vehicle 10) and may be used in providing output to users of vehicle 10 and others. Devices 46 may include buttons, joysticks, steering wheels, shift levels and/or buttons, foot-actuated controllers (e.g., a throttle pedal, a brake pedal, a clutch pedal, etc.), turn signal levers, windshield wiper controls, and other stalk controls, steering wheel buttons and other steering wheel controls, touch pads, keypads, keyboards, motion sensors, microphones, cameras, and other devices for gathering user input. Input-output circuitry 42 may also include circuitry for generating audio output such as speakers, tone generators, and vibrators (see, e.g., audio output devices 36).

Light-based devices 32 may be used to generate visible output. Light-based devices 32 may include displays (e.g., light sources with arrays of individually controlled pixels such as liquid crystal displays, organic light-emitting diode displays, projector displays, etc.), status indicator lights, and gauges to display navigation system information, media system information, vehicle status information, and other information in the interior of vehicle 10. Light-based devices 32 may include external lighting for providing light-based output outside of vehicle 10 (e.g., displays that emit light externally and/or other light sources that emit light in exterior areas of vehicle 10). In general, light-based devices 32 may include any suitable light sources that produce light in response to applied electrical signals such as lamps, light-emitting diodes, plasma display panel pixels, illuminated status indicators, displays, lasers, arrays of light sources, individual light sources, backlight units for displays, backlit or edge-lit light guides, light sources that emit one or more beams of light (e.g., a laser beam, light-emitting diode beam, or a beam associated with another collimated light source), light sources that emit light in a fixed pattern of one or more beams, light sources that emit light using raster scanning techniques, light sources that emit steerable beams (e.g., light sources with mirror arrays to steer light in a light projector system, light sources with one or more steerable mirrors, steerable lasers and light-emitting diodes, etc.), image projecting systems and other light projectors, light guide panels that contain light extraction features that cause the light guide panels to emit light in various patterns, and other electrically controlled light sources.

Light-based devices (light sources) 32 may, if desired, include light modulators. Light modulators in devices 32 may include mechanical and/or electrical modulators such as mechanical shutters, liquid crystal modulators (e.g., liquid crystal shutters having polarizers), adjustable mirrors or other modulators based on cholesteric liquid crystals, modulators that change between translucent and transparent modes (e.g., polymer-dispersed liquid crystal devices), or other structures that exhibit opaque (light scattering) and transparent modes, guest-host liquid crystal modulators, electrochromic modulators, light modulators based on electrically bleached and/or photo-bleached photochromic layers, and other light modulators. The light modulators may be used in modulating some or all of the light produced by a light source (e.g., by modulating light from one or more light-emitting diodes) and/or may be used to block stray light or otherwise adjust the appearance and performance of light sources and other devices in vehicle 10. If desired, the light modulators may be used to adjust the appearance and performance of light sources to hide the light sources or alter the appearance of the light sources so that the light sources blend into the body of vehicle 10 (e.g., to generate a uniform appearance).

Light-based devices 32 may contain individually controlled areas. These areas may be relatively small areas that serve as pixels in an array of pixels for a display-type output device (e.g., a display integrated into a dash-mounted navigation and media system or an external portion of vehicle 10). Light-based devices 32 may also include components that include one or only a few larger individually controlled areas (e.g., one or more areas of about 1-100 cm$^2$, 10-1000 cm$^2$, 100-1,000,000 cm$^2$, more than 1000 cm$^2$, less than 500 cm$^2$, etc.). For example, light-based devices 32 may contain light-producing devices that produce a single block of light over entire windows 14 in vehicle 10 or other large areas of vehicle 10. Individually controlled areas may be used to display fixed icons or other shapes, adjustable (e.g., customizable) icons or other shapes, fixed text (e.g., "stopping" to indicate the vehicle 10 is stopping, "road hazard ahead" to indicate that dangerous road conditions are in the road ahead, "fog ahead" to indicate that there is fog in the road ahead, "22 mph" to indicate that vehicle 10 is travelling at 22 mph, "closing speed is 22 mph" to indicate that a vehicle following vehicle 10 is closing in on vehicle 10 at a relative speed of 22 mph, etc.), customizable text, time-varying text, scrolling text, blinking text, and/or output of other shapes. The light output produced by light-based devices 32 may have multiple adjustable attributes (e.g., color, shape, intensity, duration, location, etc.) and any set of one or more of these attributes may be used in conveying information to a viewer.

Wireless circuitry 48 may include radio-frequency transceiver circuitry and antennas for transmitting and receiving wireless signals. The signals may include, for example, short-range signals such as wireless local area network signals (WiFi® and Bluetooth® signals) and long-range signals (e.g., cellular telephone signals and other signals at frequencies of 700 MHz to 2700 MHz and/or other suitable frequencies). Wireless circuitry 48 may be used to communicate with nearby vehicles, sensors and beacons embedded along a roadway, satellites, cellular telephone networks, cellular telephones, wristwatches, and other wireless devices. The wireless devices with which wireless circuitry 48 communicates may be associated with a driver and passengers in vehicle 10, passengers in other vehicles, pedestrians, other road users, or other people external to vehicle 10. The wireless information that is transmitted and/or received by vehicle 10 using circuitry 48 may include warnings, vehicle occupant status information, vehicle status information for vehicle 10 or other vehicles such as vehicle 10' (e.g., orientation, position, speed, acceleration/deceleration, brake status information such as information on whether or not brakes are currently being applied, throttle status, autonomous driving mode information, etc.), or information on the operating environment of vehicle 10. Operating environment information for vehicle 10 may include traffic information, weather information, temperature information, road condition information (as measured by sensors in vehicles and/or external sensors), information on the location, speed, and heading of pedestrians, information on the position of nearby objects, information on the positions of exits on highways, road locations, and other map information, safety alerts, broadcast messages, vehicle-to-vehicle wireless data informing vehicle 10 of the current and future operations of nearby vehicles, etc.

Vehicle controls 42 may include control circuitry, actuators, and other systems for controlling vehicle operation. Vehicle controls 42 may include systems for steering, braking (manual brakes, emergency brakes, power-assisted brakes, drum brakes, disc brakes, regenerative brakes that use drive motors or other systems to recover energy and convert the kinetic energy of vehicle 10 into electrical energy stored in capacitors and/or batteries or that use other techniques for storing recovered energy, or other braking systems), accelerating (e.g., motors), shifting gears, adjusting interior and exterior lights, adjusting media system functions, controlling satellite navigation system operation, adjusting airbags, seatbelts, and other safety devices, controlling audio output, controlling electronic windows, door locks, the opening and closing of doors and hatches, windshield wipers, defrosters, and other climate controls, and systems for controlling and adjusting other operations during the operating of vehicle 10. Vehicle controls 42 may be operated manually (e.g., based on input from input-devices 46) and/or may be operated autonomously (e.g., using commands from control circuitry 40 during operations in an autonomous driving mode or a safety override mode).

Using information from sensors 30, user input from devices 46 and other input from devices 42, and/or information received wirelessly from remote sources via wireless circuitry 48, control circuitry 40 of vehicle 10 may take suitable actions. Actions that may be taken by vehicle 10 in response to information from sensors 30, user input and other input, and/or wirelessly received information include transmitting wireless information (e.g., to electronic equipment such as equipment in vehicle 10', personal electronic devices in vehicle 10' or elsewhere, etc.), using vehicle controls 48 and other systems to autonomously drive or otherwise operate vehicle 10, issuing alerts (e.g., warnings associated with braking, vehicle direction changes, vehicle speed, and other vehicle conditions), issuing warnings on road hazards, weather conditions, traffic, and other operating environment information, displaying greetings and good-by messages as a driver approaches vehicle 10 or leaves vehicle 10, displaying advertisements and other commercial messages, and providing other output. Output may be supplied visually (e.g., by generating light-based output using light-based devices 32), may be supplied audibly (e.g., using audio output devices 36 to issue a tone, synthesized voice, prerecorded message, or other audible output), or may be supplied using other techniques.

Light-based devices 32 may be based on light-emitting diodes, or other sources of light. In some configurations, light-based devices 32 may be formed from light-emitting diodes or other light sources mounted adjacent to curved mirrors within clear plastic housings or other mounting structures (e.g., when forming headlights, etc.). If desired, light-based devices 32 may also have thin planar shapes (e.g., when light-based devices 32 are being mounted to windows 14 or over relatively large surface areas on body 12 of vehicle 10). For example, light-based devices 32 may include flexible or rigid light-emitting panels formed from edge-lit light guide films, organic light-emitting diode substrates, backlit liquid crystal displays, or other planar light sources. Light-based devices 32 (e.g., light-emitting panels or other light sources) may be opaque or transparent. Opaque structures associated with light-based devices 32 may be used on portions of vehicle 10 such as opaque portions of body 12 or on portions of windows 14 that can be obscured without interfering with the fields of view of the occupants of vehicle 10. Transparent light-based devices 32 may be placed on transparent portions of vehicle 10 such as portions of windows 14. When not emitting light, transparent devices will not block the views of the occupants of vehicle 10.

FIGS. 3-9 are side views of illustrative light-based devices 32. In the illustrative configuration of FIG. 3, light-based device 32 has one or more adjustable light regions 60. Each region 60 may be individually controlled to adjust the intensity of emitted light 62 from that region. Each region 60 may contain a separate light source (e.g., a light-emitting diode formed from a semiconductor die, a thin-film light-emitting diode such as an organic light-emitting diode, an individually adjustable light-emitting region such as a backlit liquid crystal display region, or other light source region). Device 32 of FIG. 3 may be opaque or transparent and may be mounted on a support structure that is opaque or transparent (see, e.g., support structure 64). Device 32 may, if desired, have a planar configuration.

Figure 3:
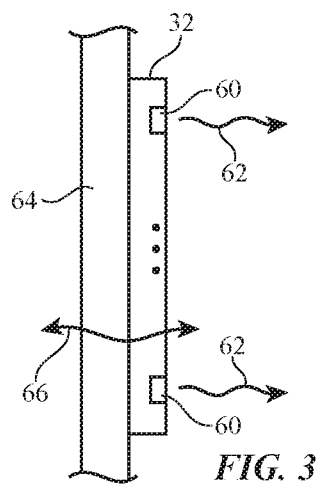
FIG. 3 is a cross-sectional side view of an illustrative portion of a vehicle with a light-based device in accordance with an embodiment.

Device 32 may include one or more transparent glass or polymer layers. For example, an array of organic light-emitting diodes may be formed on a clear polymer substrate. In configurations such as these, device 32 may be transparent. Device 32 may be mounted on a portion of vehicle 10 such as vehicle structure 64. Structure 64 may be an opaque structure or a transparent structure. As an example, structure 64 may be a transparent structure such as a portion of windows 14. In this type of arrangement, light 66 may pass through structure 64 and through device 32, as shown in FIG. 3. This may allow a driver or other occupant of vehicle 10 to look out of vehicle 10 through device 32 (e.g., through a window on which device 32 is mounted and through device 32). Device 32 may be mounted on the inside or outside of a window, may be embedded within a window, may be mounted on an opaque body surface, or may be mounted elsewhere in vehicle 10.

Figure 4:
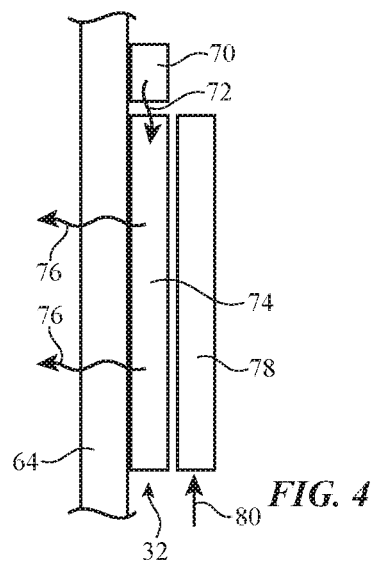
FIG. 4 is a cross-sectional side view of an illustrative light-based device having an adjustable mirror and an edge-lit light guide that serves as a light source in accordance with an embodiment.

If desired, an adjustable light modulating structure such as an electrically controllable mirror or other light modulator may be included in device 32. In the example of FIG. 4, light-emitting device 32 is an edge-lit light guide that has been covered with an electrically controllable mirror such as mirror 78. Mirror 78 may receive control signals from control circuitry 40 on input 80. When placed in a transparent state, an occupant of vehicle 10 may see through mirror 78, device 32, and structure 64 (i.e., in a configuration in which structure 64 is transparent). When placed in a reflective state, mirror 78 will reflect light that is emitted from device 32. For example, mirror 78 may ensure that light from device 32 is directed outwardly through structure 64 (e.g., a window of vehicle 10) rather than being directed into the interior of vehicle 10. If desired, mirror 78 may exhibit mirror-like reflections only in a narrow wavelength band so that mirror 78 remains transparent to most visible light in its reflective state.

Device 32 may contain one or more light-emitting diodes. Light-emitting diodes such as light-emitting diode 70 of FIG. 4 may emit light 72 that is coupled into one or more of the edges of light guide panel 74. Light guide panel 74 may be formed from clear plastic panel, a thin flexible sheet of plastic (e.g., a plastic film), a glass structure, a layer of other transparent material, portions of window 14, or other suitable light guide that guides light 72 that has been emitted from light-emitting diode 70. Light may be guided in panel 74 in accordance with the principal of total internal reflection. Light extraction features may be formed in light guide 74 that direct light 72 outwardly from light guide 74 as illustrated by extracted light 76. The light extraction features formed from surface irregularities, microbubbles, particles embedded within light guide panel 74, and/or other structures that direct light. The light extraction features may be patterned to form icons, text, large or small pixels, or light-emitting areas with other shapes. The area covered by the light extraction features may be small or may be large so that relatively large areas of light may be produced using a modest number of light-emitting diodes 70 (as an example). The operation of light-emitting diodes 70 may be controlled by control circuitry 40.

When light-emitting diodes 70 are turned off, mirror 78 may be placed in its transparent state so that device 32 and mirror 78 do not block light. When light-emitting diodes 70 are turned on, mirror 78 may be placed in its reflective state to ensure that emitted light 76 from device 32 is only directed in desired directions (i.e., through structure 64 in the example of FIG. 4). Mirror 78 may exhibit reflectance in a broad band (e.g., over all visible wavelengths) so that mirror 78 is essentially opaque in its mirror state or may exhibit reflectance in only a particular narrow region of the visible light spectrum so that mirror 78 remains transparent in its reflective state. For example, if emitted light 76 from device 32 is red (e.g., to form brake light illumination), mirror 78 may be configured to exhibit a mirror-like behavior only in a narrow portion of the visible spectrum that overlaps the red light wavelengths associated with light 76. Mirror 78 may be a cholesteric liquid crystal modulator or other suitable electrically controllable mirror. If desired, light may be selectively blocked using a light modulator panel that transitions between transparent and non-reflective opaque states. The use of a mirror-like light modulator such as a cholesteric liquid crystal modulator that selectively reflects red light is merely illustrative.

Figure 5:
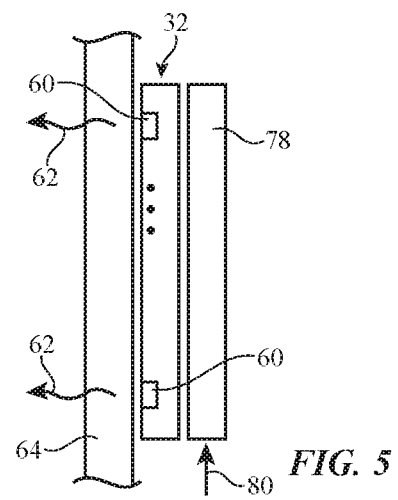
FIG. 5 is a cross-sectional side view of an illustrative light-based device having an adjustable mirror and one or more adjustable light emitters on a substrate such as a transparent substrate in accordance with an embodiment.

If desired, light modulators (e.g., mirror 78 or other suitable electrically adjustable light modulators) may be used to selectively reflect or otherwise modulate the light that has been emitted from other types of light-based devices. In the example of FIG. 5, device 32 is a transparent organic light-emitting diode device or other transparent light source that emits light from one or more regions 60. Each region 60 may, for example, include a respective light-emitting diode. Mirror 78 may be used to direct emitted light 62 through transparent vehicle structure 64 (e.g., a portion of windows 14) when device 32 is in use and may be placed in a transparent mode when it is desired to maximize light transmission through device 32 and mirror 78 when device 32 is not in use.

Figure 6:
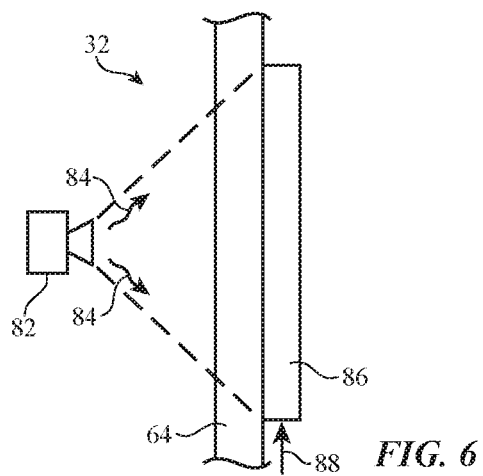
FIG. 6 is a cross-sectional side view of an illustrative display having a controllable translucent layer that may be illuminated by a light projector in accordance with an embodiment.

FIG. 6 is a side view of an illustrative light-based device that is based on a projector. As shown in FIG. 6, light-based device 32 may contain light projector 82. Light projector 82 may emit light 84. Light 84 may include one or more individually controllable areas. An electrically controllable light diffuser such as light diffuser 86 may be mounted in the path of light 84 (e.g., on a vehicle structure 64 such as a transparent vehicle structure). Diffuser 86 may be a polymer dispersed liquid crystal panel or other structure that can exhibit transparent and translucent states. Control circuitry 40 may issue control signals to panel 86 on path 88. When placed in its transparent state, panel 86 and structure 64 may be transparent and will not block a vehicle occupant's view through structure 64 (e.g., through windows 14). Projector 82 may be off when panel 86 is transparent. When projector 82 is turned on, panel 86 may be placed in its translucent (light diffusing) state, which allows light 84 to be projected onto panel 86. The light scattered from panel 86 may then be viewed by an occupant of a vehicle following vehicle 10 or other people outside of vehicle 10.

Light-based devices and light modulator structures such as devices 32, 78, and 86 of FIGS. 3, 4, 5, and 6 may be formed on interior surfaces of vehicle structure 64, on exterior surfaces of vehicle structure 64, may be embedded within a window or other vehicle structure 64 (e.g., a portion of body 12), or may be mounted in other suitable configurations. Light may be emitted in large areas (e.g., to form a single-area brake light), may be emitted in patterns (e.g., to form icons and/or text), may be emitted in pixel arrays (e.g., to produce customizable text, icons, and/or other types of customized and/or variable output), or may be emitted using any other suitable arrangements. The example of FIGS. 3, 4, 5, and 6 are merely illustrative.

Figure 7:
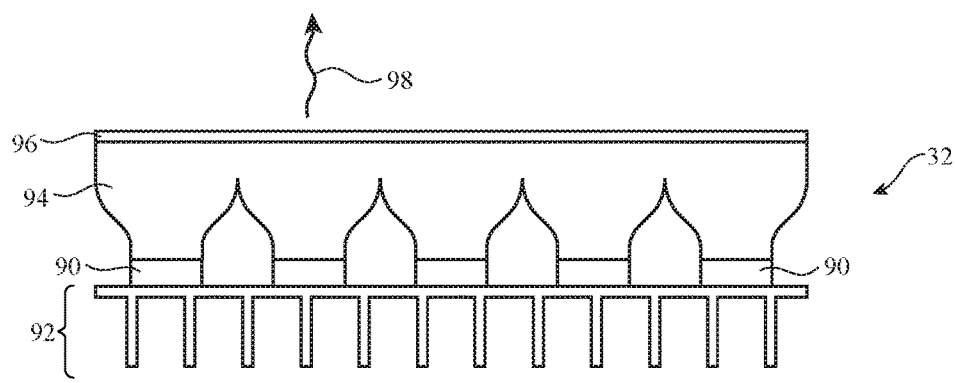
FIG. 7 is a cross-sectional side view of an illustrative backlit light guide in accordance with an embodiment.

FIG. 7 is a cross-sectional side view of an illustrative configuration for light-based device 32 based on a back-lit light guide. As shown in FIG. 7, device 32 may contain one or more light-emitting diodes 90 (e.g., an array of individually controllable light-emitting diodes or one or more light-emitting diodes 90 that are operated in unison). Light-emitting diodes 90 may be mounted on a support structure such as heat sink 92. Back-lit light guide 94 (e.g., a light guide formed from molded transparent plastic or other suitable light guiding structures) may be used to distribute light from light-emitting diodes 90 to respective portions of diffuser layer 96 (e.g., without forming gaps between respective portions). When light-emitting diodes 90 are turned on, diffuse light 98 may be emitted from the exposed surface of light-diffusing film 96.

Figure 8:
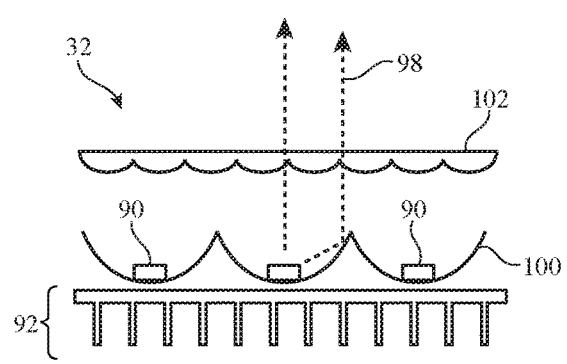
FIG. 8 is a cross-sectional side view of an illustrative light-based device with an array of light-emitting diodes mounted in reflectors in accordance with an embodiment.

In the illustrative example of FIG. 8, light-based device 32 has one or more light-emitting diodes 90 mounted within one or more respective mirrors 100 (e.g., curved mirrors) on heat sink 92. Lenticular foil 102 may have downwardly facing reflective ridges that help homogenize light from light-emitting diodes 90. During operation, device 32 may emit light 98 that has been produced by light-emitting diodes 90 and that has been directed outwardly through openings in foil 102 by mirror structures 100 and light homogenizing structures such as foil 102.

Figure 9:
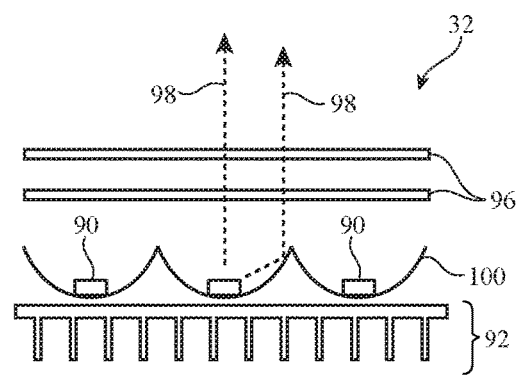
FIG. 9 is a cross-sectional side view of an illustrative light-based device with an array of light-emitting diodes and diffuser films in accordance with an embodiment.

FIG. 9 is a cross-sectional side view of light-based device 32 in an arrangement in which light 98 from light-emitting diodes on heat sink 92 is directed upwardly through one or more diffusing layers 96 by mirrors 90.

Colors may be imparted to light-emitting diodes in regions 60, light-emitting diodes 70, light-emitting diodes in projector 82, and/or light-emitting diodes 90 in devices 32 of the type shown in FIGS. 7, 8, and 9 using color filters, organic emissive material of desired colors, gratings, colored mirrors or diffusing layers, photoluminescent materials, or other suitable structures that impart emitted light from devices 32 with desired colors.

During operation of vehicle 10, a driver may press a brake pedal or supply other input with devices 46. Control circuitry 40 may detect this user input or other input from input-output circuitry 42 (e.g., sensor inputs, wireless signals associated with vehicle-to-vehicle communications, etc.). Control circuitry 40 may then process the received data from the user and/or other sources and can take suitable actions. As an example, control circuitry 40 may issue a wireless message, may create an audible alert or other audio output, and/or may emit light that is viewable by an occupant of vehicle 10 using devices 32.

In some situations, control circuitry 40 may detect braking input or other input for which brake light output or other output on the rear of vehicle 10 is appropriate. Brake light output may be displayed using a single set of rear brake lights, may be displayed using a pair of rear-mounted brake lights on the left and right sides of vehicle 10 in combination with a higher brake light in the center of the rear of vehicle 10 (sometimes referred to as a center mounted high stop light), and/or may be displayed using one or more additional brake light regions (e.g., horizontal and/or vertical strips, portions of windows 14, etc.). Brake light output may be displayed in an analog fashion, so that increases in braking input or other appropriate input results in correspondingly more brake light output and/or may be displayed in a stepwise fashion (e.g., so that predetermined amounts of brake light output are not provided until a brake pedal input or other input has exceeded a given threshold). If desired, brake light output may be accompanied by other forms of braking indicator output such as audio brake indicator output, wireless messages indicative of vehicle braking, or other braking indicator output from input-output circuitry 42. The use of control circuitry 40 to produce brake light output in response to driver braking or other data is merely illustrative.

To enhance safety, it may be desirable to provide output from vehicle 10 (e.g., braking light output or other output) in multiple levels (e.g., in a stepwise output arrangement). When the need for a warning is lowest (e.g., when a driver is not applying brakes), the output from vehicle 10 may be lowest (e.g., no brake lights may be illuminated, no audio output may be generated, and/or no wireless alerts may be generated). When the need for a warning is highest (e.g., in an emergency situation in which a driver is braking hard to avoid an accident), vehicle 10 may supply output from vehicle 10 in an elevated fashion (e.g., by producing a relatively large amount of braking light output or by otherwise enhancing the ability of a driver of a following vehicle or others outside of vehicle 10 to detect the output). In intermediate situations (e.g., in non-emergency situations in which the driver of vehicle 10 is braking a moderate amount), corresponding intermediate level(s) of warning may be produced (e.g., braking light may be supplied by vehicle 10 at one or more intermediate levels).

Consider, as an example, the illustrative scenario of FIGS. 10, 11, 12, and 13. In this example, vehicle 10 has brake lighting formed from light-based devices 32 in multiple different regions on the rear of vehicle 10 such as region 100-1 (e.g., a center mounted high stop light position), region 100-2 (a rear brake light position on body 12), region 100-3 (a horizontal strip running across some or all of the rear of body 12), and region 100-4 (some or all of the portion of rear window 14R that is not covered by center mounted high stop light 110-1). These locations of these regions and/or the patterns of light emitted in these regions may be customized by a driver or other user of vehicle 10 by supplying control circuitry 40 with text, images, graphics, voice input, menu selections, or other user input via input-output devices 46. For example, a user of vehicle 10 may select from a menu of pre-approved brake light patterns for the rear of vehicle 10 in region 110-3 and/or other regions.

Figure 10:
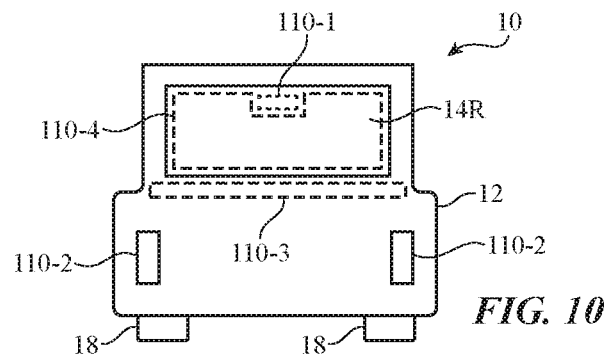
FIG. 10 is a rear view of an illustrative vehicle in a situation in which no braking is being applied to the vehicle in accordance with an embodiment.

Vehicle 10 of FIGS. 10, 11, 12, and 13 is shown in four different illustrative braking scenarios. In the scenario of FIG. 10, vehicle 10 is being driven normally and the driver of vehicle 10 is not pressing on the brake pedal of vehicle 10. Because no brake light warning for following vehicles is needed in this situation, none of the brake light regions on the rear of vehicle 10 have been activated (i.e., the light-based devices 32 in regions 110-1, 110-2, 110-3, and 110-4 of vehicle 10 of FIG. 1 are all off).

Figure 11:
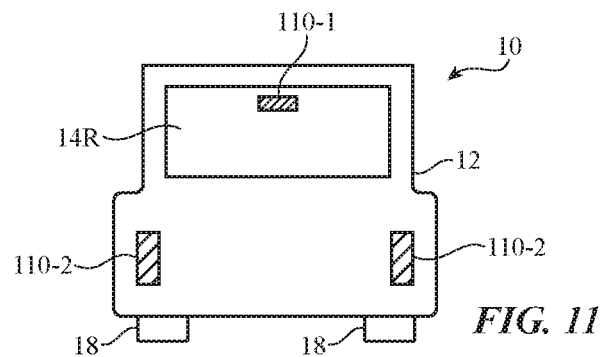
FIG. 11 is a rear view of the illustrative vehicle of FIG. 10 in a situation in which a low amount of braking is being applied to the vehicle in accordance with an embodiment.

In the scenario of FIG. 11, the driver of vehicle 10 is pressing lightly on the brake pedal of vehicle 10. As a result, more of the brake light regions on the rear of vehicle 10 have been lit. In particular, light-based devices 32 in regions 110-2 and 110-1 have been activated, so that regions 110-1 and 110-2 are illuminated and are producing brake light for the vehicle following vehicle 10. Brake light illumination may be red or other suitable color that complies with brake lighting regulations.

Figure 12:
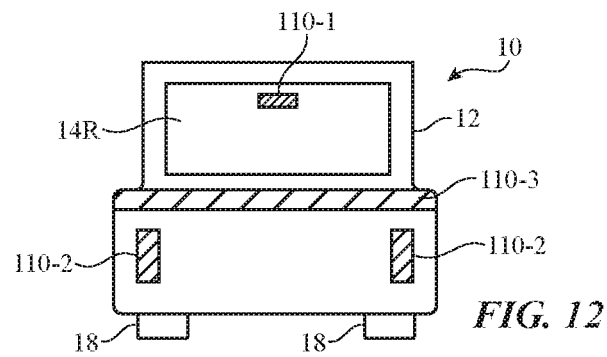
FIG. 12 is a rear view of the illustrative vehicle of FIG. 10 in a situation in which a moderate amount of braking is being applied to the vehicle of FIG. 10 in accordance with an embodiment.

In the scenario of FIG. 12, the driver of vehicle 10 is braking more strongly than in the scenario of FIG. 11. In response to detecting this higher level of braking, control circuitry 40 illuminates more brake light regions such as horizontal strip region 100-3 of FIG. 12.

Figure 13:
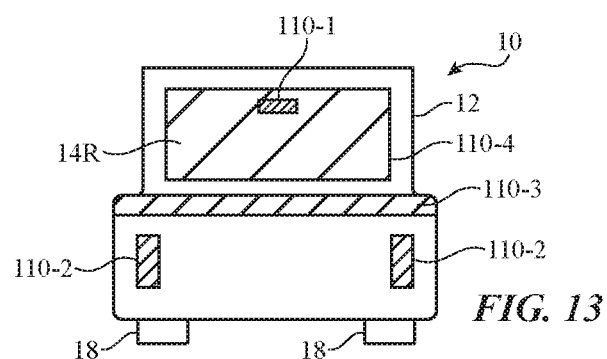
FIG. 13 is a rear view of an illustrative vehicle of FIG. 10 in a situation in which a heavy amount of braking is being applied to the vehicle in accordance with an embodiment.

An emergency braking scenario is illustrated in FIG. 13. When control circuitry 40 detects heavy braking, control circuitry 40 can turn on all brake light regions on the rear of vehicle 10. In the FIG. 13 scenario, brake light region 110-4 has been illuminated in addition to previously illuminated brake light regions 110-1, 110-2, and 110-3.

The presence of increasing levels of brake light illumination on the rear of vehicle 10 helps accurately inform the drivers of following vehicles of the current braking status of vehicle 10. Because information on a variety of different braking levels is conveyed, the likelihood that these drivers will overreact or underreact to changes in the braking status of vehicle 10 is reduced.

In the example of FIGS. 10, 11, 12, and 13, one or more additional brake light areas were illuminated as progressively higher levels of braking were detected (e.g., as control circuitry 40 detected that the brake pedal in vehicle 10 was respectively pressed by less than a first threshold, by more than the first threshold, by more than a second threshold, and by more than a third threshold). If desired, the output of one or more of the light-based devices 32 associated with the brake light regions of vehicle 10 may be increased in a continuously variable (analog) manner (e.g., so that small changes up or down in the amount of applied brake pressure result in corresponding small changes up or down in the illumination of one or more brake light regions). Analog adjustments such as these may be used for one or the brake light regions on the rear of vehicle 10, some of the brake light regions on the rear of vehicle 10, or on all brake light regions.

In addition to or instead of varying brake light intensity in an analog and/or binary fashion, other brake light attributes may be varied by controlling light-based devices 32. Examples of brake light attributes that may be varied include: brake light color, brake light duration (e.g., blinking period), the content of a brake light pattern (e.g., the presence or absence of ancillary warnings such as text warnings or icon warnings), the location and/or number of brake light regions that are illuminated within a predetermined region, the content of a text warning message or other text message, brake light illumination blinking patterns (e.g., the order in which multiple different brake light regions are illuminated in sequence), etc. Braking status may also be conveyed by sending wireless messages (e.g., to inform the occupants of nearby vehicles of braking status), and/or by issuing audible alerts. Wireless messages may be sent to other vehicles such as vehicle 10' (e.g., a following vehicle) using vehicle-to-vehicle communications and/or may be conveyed to the cellular telephone, wristwatch, or other wireless device associated with pedestrians or others outside of vehicle 10.

Figure 14:
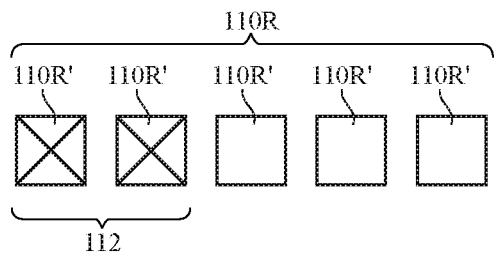
FIG. 14 is a diagram of an illustrative segmented light system of the type that may be used to display braking information or other information in accordance with an embodiment.
Figure 15:
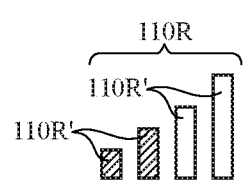
FIG. 15 is a diagram of an illustrative light system with bars of different heights in accordance with an embodiment.

FIG. 14 shows illustrative brake light output that may be provided using a segmented brake light region. Brake light region 110R includes multiple individually controllable subregions 110R'. Regions 110R' may be illuminated in a pattern that is responsive to the amount of braking of vehicle 10 that is detected by control circuitry 40 (e.g., using a brake pedal sensor). If no braking is detected, light-based devices 32 in regions 100R' may be turned off. If hard braking is detected, all of regions 110-R' in region 110R may be illuminated. In the scenario of FIG. 14, an intermediate level of braking has been detected, so two of regions 110R' (i.e., regions 112) have been illuminated. In the example of FIG. 15, regions 110R' have progressively increasing size, which helps visually convey the relative importance of each region when braking status information is being displayed.

Figure 16:
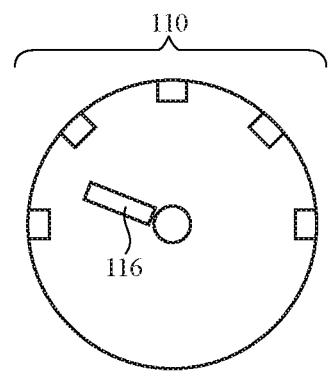
FIG. 16 is a diagram of illustrative output from a light-based device including a gauge such as a speed gauge in accordance with an embodiment.

In addition to displaying brake light information on the rear of vehicle 10, it may be desirable to display associated information such as vehicle speed, the relative speed between a vehicle following vehicle 10 and vehicle 10 (sometimes referred to as a closing speed), or other information related to the status of vehicle 10. If desired, vehicle speed or relative vehicle speed may be displayed textually. In the example of FIG. 16, vehicle light region 110 on the rear of vehicle 10 has the shape of a gauge (e.g., a speedometer). The speed of vehicle 10 or the relative speed between a following vehicle and vehicle 10 may be displayed by arm 116 of the gauge. Arrangements of the type shown in FIGS. 14, 15, and 16 may be used in displaying vehicle speed, closing speed, position information, and/or other information (e.g., information in addition to or instead of braking information).

Figure 17:
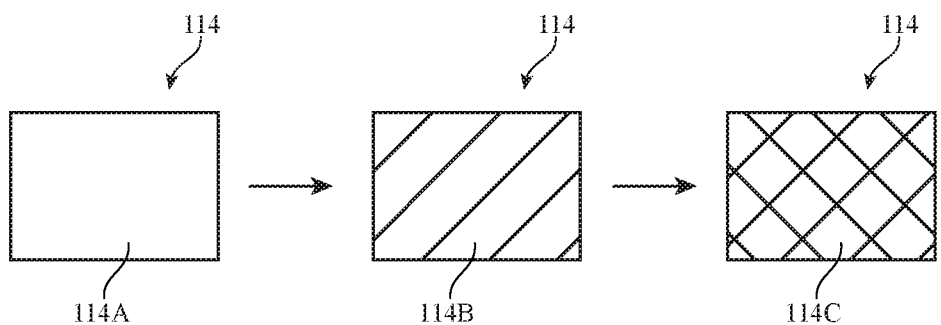
FIG. 17 is a diagram showing how a light such as a brake light or other light may have a stepwise-varying or continuously varying intensity in accordance with an embodiment.

As illustrated in FIG. 17, a vehicle lighting area (e.g., area 114) may be illuminated with progressively varying amounts of light (e.g., low light amount 114A, moderate light amount 114B, and large light amount 114C). Light output and/or other output characteristics may be varied in a stepwise fashion and/or in an analog fashion.

Figure 18:
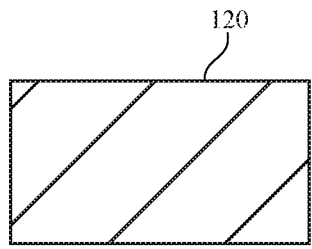
FIG. 18 is a diagram of an illustrative light with continuously variable or step-wise varying output intensity in accordance with an embodiment.
Figure 19:
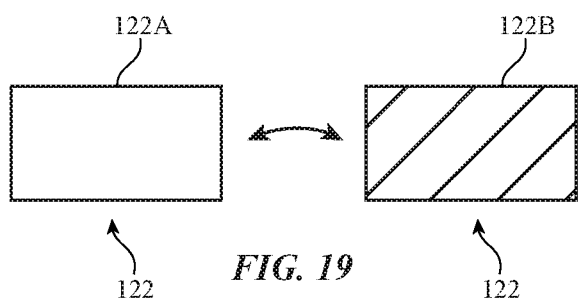
FIG. 19 is a diagram illustrating how a vehicle light may flash to provide warning information in accordance with an embodiment.
Figure 20:
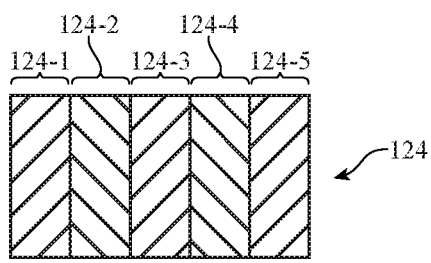
FIG. 20 is a diagram of illustrative vehicle light output provided by a light-based device with areas that are adjusted independently in accordance with an embodiment.
Figure 21:
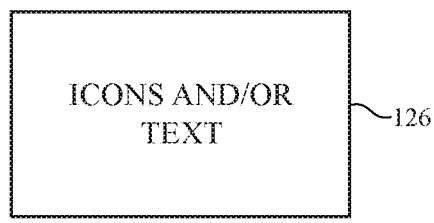
FIG. 21 is a diagram of illustrative vehicle light output from a light-based device that displays information such as warning information in the form of icons, graphics, and/or alphanumeric characters (text) in accordance with an embodiment.

The lighting regions on vehicle 10 associated with light-based devices 32 may have any suitable pattern. FIG. 18 shows an illustrative solid pattern in which a single light-based device 32 has illuminated rectangular area 120. The intensity of the illumination of area 120 may be adjusted to convey brake status information or other information. In the example of FIG. 19, lighting region 122 alternates (blinks) between an unilluminated state (state 122A) and an illuminated state (state 122B). FIG. 20 shows an illustrative lighting region (region 124) that has multiple strip-shaped areas 124-1, 124-2, 124-3, 124-4, and 124-5. These areas may be illuminated in sequence as with segmented region 110R of FIG. 14, may be turned on and off in different patterns, may use a chasing lights pattern, may flash at one or more different frequencies, may have one or more different colors and/or intensities, and/or may use other illumination schemes to convey information. The example of FIG. 21 shows how a lighting region for vehicle 10 such as region 126 may include icons and/or text. Text (e.g., alphanumeric characters) may contain static text information (e.g., "stopping" to indicate that vehicle 10 is stopping) or may contain information that is continuously updated (e.g., "current speed is 22 mph"). Non-vehicular information may also be displayed (e.g., "tornadoes in area," "fog ahead on roadway," "traffic congestion in 1 mile," etc.). Icons in region 126 may include warning symbols (e.g., warning triangles, icons that include warning information within triangular boundaries, etc.). Text, graphics, video, and/or other information in a lighting region on vehicle 10 may be used to display vehicle status information such as the current speed of vehicle 10 (see, e.g., region 128 of FIG. 22) and/or the relative speed between vehicle 10 and a vehicle following vehicle 10 as determined by sensors 18 such as a lidar sensor, ultrasonic sensor, camera, speedometer, and/or other sensors that determine the speed of vehicle 10 and the relative speed of the following vehicle (see, e.g., region 130 of FIG. 23). If desired, warning information and/or other information may be displayed as a function of vehicle closing speed (relative speed), vehicle heading information, vehicle position, weather, other vehicle status and operating environment information, etc.

Figure 22:
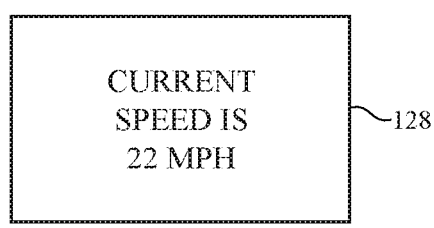
FIG. 22 is a diagram of illustrative vehicle light output from a light-based device that displays current vehicle speed in accordance with an embodiment.
Figure 23:
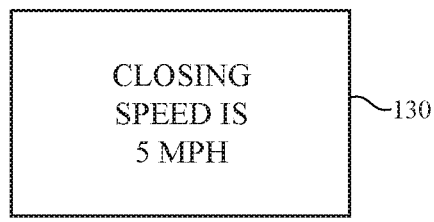
FIG. 23 is a diagram of illustrative vehicle light output from a light-based device that displays the difference in speed between a vehicle and a following vehicle in accordance with an embodiment.

Areas such as area 114 of FIG. 17, region 110R of FIG. 15, a gauge-type indicator pattern such as brake light gauge 110R of FIG. 16, regions such as regions 110-1, 110-2, 110-3, 110-4, region 120 of FIG. 18, region 122 of FIG. 19, region 124 of FIG. 20, and regions 126, 128, and 130 of FIGS. 21, 22, and 23, and other regions illuminated by light-based devices 32 in vehicle 10 may be formed on the rear of vehicle 10, on the sides of vehicle 10, on the roof of vehicle 10, on the front of vehicle 10, on windows 14, on body 12, on wheels 18, and/or on other portions of vehicle 10. These areas may be provided with text, solid patterns of light, light with adjustable colors, light that is displayed with a particular timing (e.g., flashing, etc.), light that has a stepwise varying intensity, light that has a continuously varying intensity, or other light-based output to convey information to viewers of vehicle 10. The light-based output may be accompanied by sound output (tones, synthesized and/or pre-recorded voice, etc.) and/or wirelessly conveyed information (e.g., messages to vehicles, portable electronic devices, and other recipients with wireless receivers).

Lighting regions may be used to convey information on braking status (e.g., whether or not brakes have been applied and, if so, how strongly they have been applied) or other vehicle status information (e.g., driving mode—autonomous or manual, vehicle speed, vehicle orientation, vehicle position, etc.), upcoming vehicle navigation information (e.g., whether vehicle 10 is about to exit the highway as determined by navigation system information in vehicle 10 or other data source), whether vehicle 10 has detected a pedestrian or other obstacle in its path and is about to stop, whether the control circuitry of vehicle 10 is predicting that vehicle 10 will potentially be struck by another vehicle or is subject to other collision risks, whether vehicle 10 is executing a stop, turn, acceleration-related maneuver, or other procedure, etc.

Figure 24:
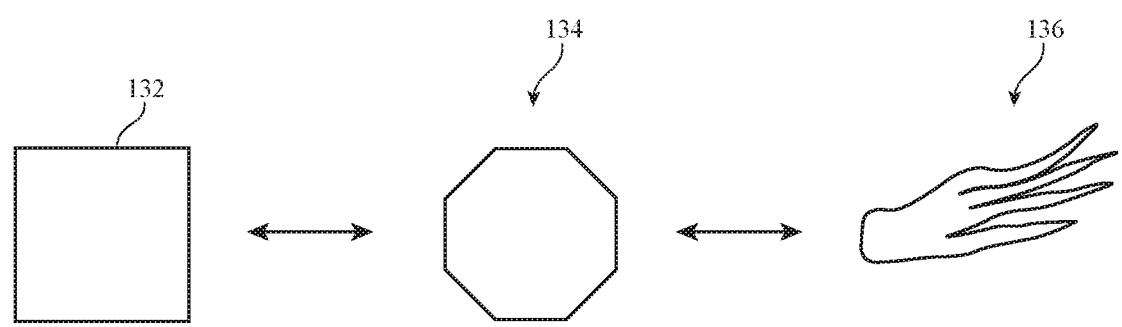
FIG. 24 is a diagram of different illustrative user-selectable vehicle light output patterns that may be associated with a customizable vehicle light in accordance with an embodiment.

If desired, the lighting regions displayed on vehicle 10 may be customized by a driver or other user of vehicle 10. For example, control circuitry 40 may use input-output circuitry 42 to present the driver or other user with a selectable on-screen menu option or other selectable option (e.g., a voice command option, an option presented on an accessory device such as a cellular telephone or wristwatch that is wirelessly linked to vehicle 10, etc.) so that the user can select between different lighting schemes for a given lighting region. As an example, a user may be presented with an opportunity to select between the patterns of FIG. 24 (e.g., a square pattern such as region 132, a stop-sign shaped pattern such as region 134, and flame-shaped pattern such as region 136).

Once chosen, a selected pattern may be presented by light-based device 32. As an example, a pattern selected from the illustrative pattern choices of FIG. 24 may be displayed in a region such as region 112-2 or other region on the rear of vehicle 10 to serve as customized brake lights. Users can supply control circuitry 40 with customized text, customized icons, images that serve as output, custom colors, or other suitable customized patterns. The available options from which users can choose may satisfy applicable regulations on vehicle lighting. If desired, satellite navigation system information, user-supplied geographic information, or other location information may be used by control circuitry 40 to determine the current regulatory environment in which vehicle 10 is operating. Control circuitry 40 may then switch to a compliant output light pattern (e.g., a default pattern or an appropriate user-selected pattern) in the event that a given user-selected pattern becomes non-compliant as a user travels between different jurisdictions.

Figure 25:
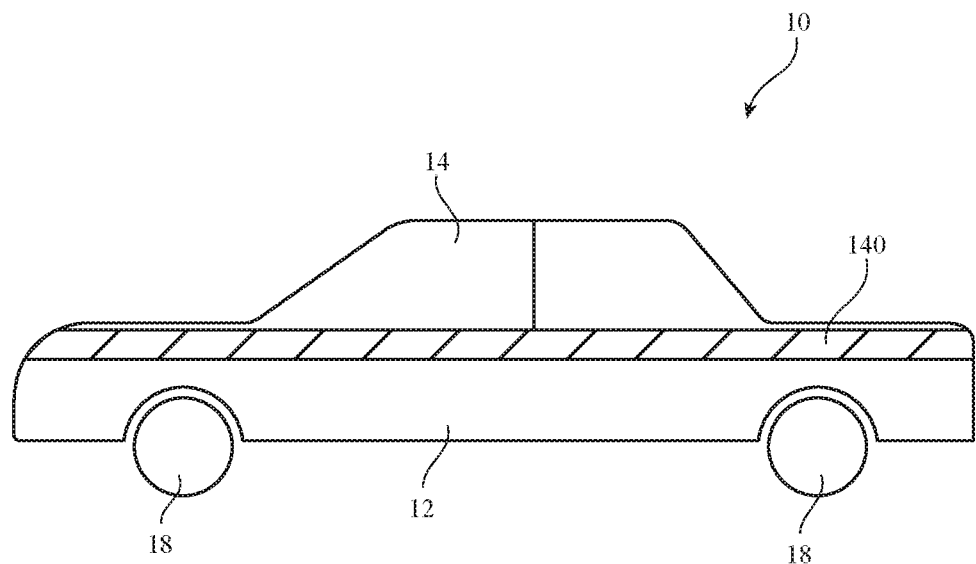
FIG. 25 is a side view of an illustrative vehicle with exterior lighting in accordance with an embodiment.
Figure 26:
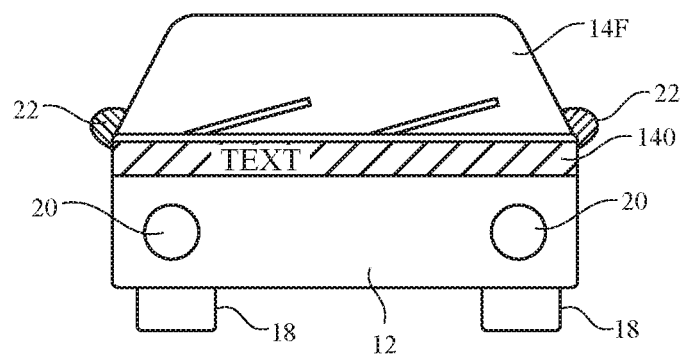
FIG. 26 is a front view of an illustrative vehicle with exterior lighting in accordance with an embodiment.

If desired, vehicle exterior lighting may extend in a horizontal band around one or more sides of vehicle 10 or may otherwise be provided on the sides of vehicle 10. As shown in FIGS. 25 and 26, for example, lighting region 140 may extend along the sides of body 12 and across the front of body 12 (and, if desired, along the rear of body 12 as illustrated by lighting region 110-3 of FIG. 10). Lighting region 140 may contain light of varying intensity, flashing light, light of one or more colors, text, icons, or other information. As an example, lighting region 140 may display one type of information (color, text, icon, intensity, font, etc.) when vehicle 10 is being operated manually and may be display another type of information when vehicle 10 is being operated autonomously by control circuitry 40. In this way, people in the vicinity of vehicle 10 may be informed when vehicle 10 is operating autonomously.

Text, icons, or other information in region 140 may convey warnings to pedestrians, following vehicles, and others outside of vehicle 10. Examples of information that may be conveyed includes messages such as "stopping," "driving autonomously," "about to turn right," "accelerating," "slippery road," "stay in crosswalk," etc. Greetings and good-by messages may be displayed. For example, sensors 30 may detect when a driver of vehicle 10 is approaching vehicle 10 from the outside of vehicle 10 and can display a greeting on light-based devices. Sensors 30 can track the location of the driver or other user of vehicle 10 as the user walks around vehicle 10 and can adjust the location of the displayed information accordingly. Good-by messages may be displayed to a driver as the driver leaves the vicinity of vehicle 10. Commercial information (e.g., advertisements), public service announcements, reminders, messages associated with incoming emails, voice mails, and text messages (e.g., "you have three new messages"), other notifications (e.g., "wiper fluid is low—fill up before you drive"), and other content may be displayed on the exterior of vehicle 10 using light-based devices 32. Warnings and other information may be generated as a result of user input to vehicle input devices such as input to a brake pedal, accelerator, steering wheel, or other input device, may be generated based on sensor input (e.g., lidar, cameras, and other object-detection sensors), may be based on navigation system information (e.g., information that reveals where vehicle 10 is driving autonomously or is being driven under manual control), may be based on wirelessly received vehicle-to-vehicle communications, may be based on other wireless data, or may be based on other information about vehicle status and the operating environment of vehicle 10.

Figure 27:
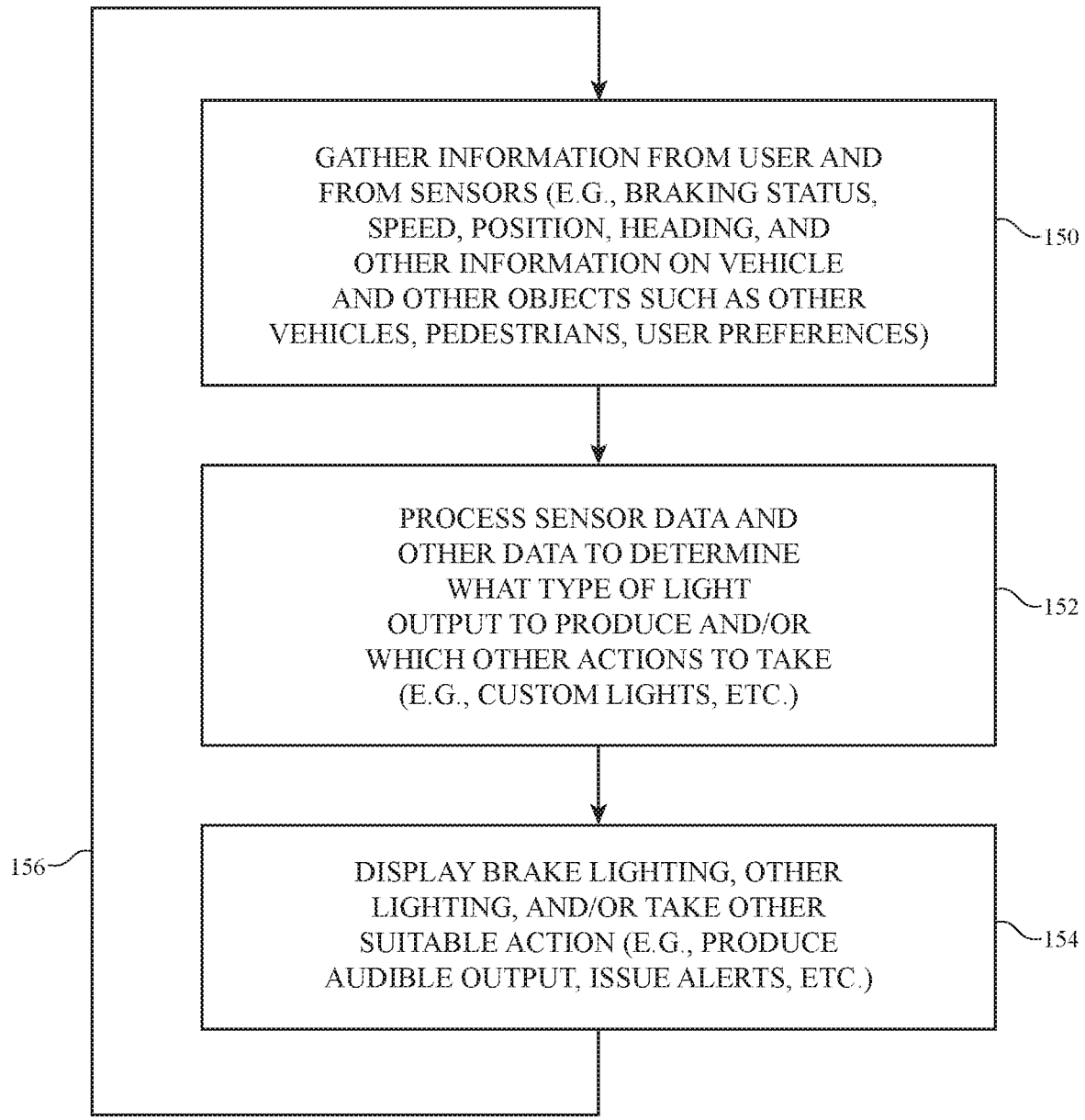
FIG. 27 is a flow chart of illustrative steps involved in operating a vehicle and associated systems while producing light-based warnings and other output in accordance with an embodiment.

Illustrative steps involved in operating vehicle 10 are shown in FIG. 27. At step 150, control circuitry 40 may gather information from a driver or other user of vehicle 10 (e.g., user input through a user input interface associated with selection of a custom lighting scheme for exterior vehicle lighting such as brake lighting or other lighting), may gather information from sensors 18 (e.g., brake sensors, accelerator pedal sensors, steering wheel sensors, sensors associated with other vehicle control input devices that receive user input, sensors that measure the external environment around vehicle 10 such as lidar sensors, cameras, etc., and other sensors 18), and may gather information from wireless sources such as other vehicles 10', remote portable equipment (cellular telephones, wristwatch devices, etc.), satellite navigation system satellites, wireless road infrastructure, and other data sources.

At step 152, the sensor data and other data may be processed. For example, control circuitry 40 may determine how strongly a driver is applying a brake pedal, may determine how much a driver is accelerating, may determine the orientation, speed, and position of vehicle 10, may determine the relative speed between vehicle 10 and a following vehicle (e.g., vehicle 10') may determine the orientations, speeds, and locations of pedestrians and others outside of the body of vehicle 10, cyclists, and other vehicles relative to vehicle 10, may determine whether vehicle 10 is about to turn, whether there is risk that vehicle 10 will collide with an object (e.g., whether vehicle 10 is on a collision course with another vehicle), whether vehicle 10 has been switched into or out of autonomous mode, whether vehicle 10 is about to stop, may determine whether pedestrians or others outside of vehicle 10 are in the path of vehicle 10, may track the location(s) of one or more people outside of vehicle 10 (e.g., a driver who is approaching vehicle 10 and or who is departing vehicle 10 after a drive) and may make other determinations on the current status of vehicle 10, the predicted behavior of vehicle 10, the movement and position of vehicle 10 relative to other vehicles and pedestrians, weather and road conditions, the movement of people in the vicinity of vehicle 10, and other information on vehicle status and the operating environment for vehicle 10. Information on incoming wireless messages and other status information may also be gathered.

At step 154, the determinations of step 152 may be used by control circuitry 40 in generating warnings and other output (e.g., text and/or icons that serve as greetings, goodby messages, status information, notifications, reminders, advertisements, public service announcements, etc). The output may be supplied to the occupants of vehicle 10 and to the occupants of other vehicles, pedestrians, cyclists, people walking around vehicle 10 (whose locations can be tracked using sensors 30 such as cameras, radar, lidar, proximity sensors, etc.) and others outside of vehicle 10. Output may be supplied wirelessly (e.g., in the form of messages to personal electronic devices associated with message recipients), may be supplied audibly (e.g., by issuing an alert using speakers in vehicle 10), and/or may be issued using light emitted from light-based devices 32. Light-based devices 32 may emit light from the rear of vehicle 10 (e.g., light in one or more brake light regions) or may emit light from the roof, front, sides, or wheels of vehicle 10). The light that is emitted may be emitted in a stepwise fashion (e.g., with increasing numbers of light-emitting regions such as increasing numbers of brake light regions being added with increasing braking or other activity and/or with a stepwise increase in emitted light intensity or other output characteristics), may be emitted in an analog fashion (e.g., so that each variation in brake intensity or other change results in a corresponding variation in light-based output), and/or may involve other visual changes (changes in color, pattern, light duration, text content, icon content, etc.). Visible output from light-based devices 32 may be used to provide information on the status of the brakes of vehicle 10 and the operation of other vehicle controls, potential collision risks (e.g., collision risks related to differences in speed between vehicle 10 and other vehicles and/or distances between vehicle 10 and other vehicles, collision risks due to the projected path of vehicle 10 and the locations and trajectories of objects near to this projected path, etc.), information on the intended route of vehicle 10, autonomous mode status information, greetings, advertisements, notifications, reminders, information about incoming message status, public service announcements, and other information produced during the processing operations of step 152. As an example, when vehicle 10 detects that a person has arrived in the vicinity of vehicle 10, text for a greeting message may be displayed on a portion of light-based devices 32 that is visible to the detected person. As indicated by line 156, operations may loop back to step 150 after step 152 (i.e., data gathering, data processing, and output generation operations may be performed continuously).

The foregoing is merely illustrative and various modifications can be made by those skilled in the art without departing from the scope and spirit of the described embodiments. The foregoing embodiments may be implemented individually or in any combination.

What is claimed is:

1. A passenger vehicle operable in an autonomous mode, comprising:
   vehicle controls that control steering, acceleration, and braking for the passenger vehicle;
   a light-based device that emits light; and
   control circuitry that operates the passenger vehicle in the autonomous mode in which the control circuitry autonomously drives the passenger vehicle using the vehicle controls, wherein the control circuitry adjusts the light-based device to display an image on an exterior of the passenger vehicle in response to operating the passenger vehicle in the autonomous mode.

2. The passenger vehicle defined in claim 1 wherein the control circuitry directs the light-based device to display a text message in response to operating in the autonomous mode.

3. The passenger vehicle defined in claim 2 wherein the text message is a warning message and wherein the control circuitry displays the warning message in response to a change in vehicle status.

4. The passenger vehicle defined in claim 3 wherein the change in vehicle status is a decrease in vehicle speed.

5. The passenger vehicle defined in claim 4 wherein the warning message comprises alphanumeric characters displayed on the light-based device.

6. The passenger vehicle defined in claim 4 further comprising a body having a front, rear, and sides and wherein the light-based device provides illumination for the passenger vehicle in a lighting region that extends in a horizontal strip across at least the front of the body.

7. The passenger vehicle defined in claim 1 wherein the light-based device comprises light-emitting diodes on a transparent substrate.

8. The passenger vehicle defined in claim 7 further comprising a rear window, wherein the light-based device is mounted on the rear window and wherein the light-based device is operable in a transparent state in which objects outside of the passenger vehicle are visible through the light-based device and the rear window.

9. The passenger vehicle defined in claim 1 wherein the light-based device comprises a light source that emits light into a light guide.

10. A vehicle operable in an autonomous mode, comprising:
    vehicle controls that control steering, acceleration, and braking for the vehicle;
    a light-based device that emits light; and
    control circuitry that operates the vehicle in the autonomous mode in which the control circuitry autonomously drives the vehicle using the vehicle controls, wherein the control circuitry adjusts the light-based device in response to operating the vehicle in the autonomous mode, wherein the light-based device comprises a mirror operable in a transparent state and a reflective state, and wherein the mirror reflects light out of the vehicle when the mirror is in the reflective state.

11. A vehicle operable in an autonomous mode, comprising:
    a body;
    control circuitry in the body;

a light-based device that emits light at a location outside of the body, wherein the light-based device displays autonomous driving mode status information; and a sensor with which the control circuitry detects a person outside of the body, wherein the control circuitry uses the light-based device to display the autonomous driving mode status information in response to detecting the person.

12. The vehicle defined in claim 11 wherein the autonomous driving mode status information comprises text indicating that the vehicle is being operated in the autonomous mode.

13. The vehicle defined in claim 11 further comprising a window, wherein the light-based device is mounted on the window.

14. The vehicle defined in claim 13 wherein the light-based device is transparent when the light-based device is not emitting light.

15. The vehicle defined in claim 14 wherein the light-based device comprises a mirror that reflects the light out of the vehicle.

16. A vehicle operable in an autonomous mode, comprising:

a body having a rear;

a light-based device that emits light in a brake light region on the rear;

control circuitry that directs the light-based device to display information indicating when the vehicle is being operated in the autonomous mode; and sensors that gather information on vehicle operating status, wherein the control circuitry directs the light-based device to display an image in the brake light region based at least partly on the vehicle operating status.

17. The vehicle defined in claim 16 further comprising:

a user input device that receives user input, wherein the control circuitry directs the light-based device to display a custom brake light pattern in the brake light region based on the user input.

18. The vehicle defined in claim 17 wherein the image includes alphanumeric characters.

19. The vehicle defined in claim 16 further comprising a rear window, wherein the light-based device is mounted on the rear window and wherein the light-based device is operable in a transparent state in which objects outside of the vehicle are visible through the light-based device and the rear window.

20. The vehicle defined in claim 16 wherein the image includes at least one of: graphics and video.

* * * * *